United States Patent [19]

Fontana et al.

[11] Patent Number: 5,210,122
[45] Date of Patent: May 11, 1993

[54] NEAR-INFRARED STABILIZED COPOLYESTERCARBONATE COMPOSITIONS

[75] Inventors: Luca P. Fontana, Evansville; Kenneth F. Miller; Edgar E. Bostick, both of Mt. Vernon, all of Ind.

[73] Assignee: General Electric Company, Pittsfield, Mass.

[21] Appl. No.: 690,747

[22] Filed: Apr. 24, 1991

[51] Int. Cl.[5] .......................... C08K 5/16; C08K 5/17; C08K 5/33

[52] U.S. Cl. ........................... 524/255; 524/88; 524/204; 524/236; 524/249

[58] Field of Search ............... 524/255, 88, 204, 236, 524/249

[56] References Cited

U.S. PATENT DOCUMENTS

| | | | |
|---|---|---|---|
| 3,251,881 | 5/1966 | Susi et al. | 524/255 |
| 3,341,464 | 9/1967 | Susi et al. | 524/236 |
| 3,575,871 | 4/1971 | Susi et al. | 524/249 |
| 4,286,083 | 7/1981 | Kochanowski | 528/173 |
| 4,506,065 | 3/1985 | Miller et al. | 528/173 |
| 4,612,271 | 9/1986 | Makino et al. | 430/72 |
| 4,628,074 | 12/1986 | Boutni | 524/236 |
| 4,816,386 | 3/1989 | Gotoh et al. | 524/88 |
| 4,873,279 | 10/1989 | Nelson | 524/249 |
| 4,983,706 | 8/1991 | Fontana et al. | 528/176 |
| 5,025,081 | 6/1991 | Fontana et al. | 528/182 |

FOREIGN PATENT DOCUMENTS

| | | |
|---|---|---|
| 0044911 | 2/1982 | European Pat. Off. |
| 0135792 | 4/1985 | European Pat. Off. |
| 0375898 | 7/1990 | European Pat. Off. |

*Primary Examiner*—Paul R. Michl
*Assistant Examiner*—Tae H. Yoon

[57] ABSTRACT

A polymeric composition having aromatic polycarbonate or aromatic polycarbonate like properties which process at significantly lower temperatures than aromatic polycarbonate in admixture with an additive which is incompatible with an aromatic polycarbonate at standard processing temperature.

16 Claims, No Drawings

NEAR-INFRARED STABILIZED COPOLYESTERCARBONATE COMPOSITIONS

BACKGROUND OF THE INVENTION

Polycarbonates are well known amorphous polymers known inter alia for their transparency, toughness and impact resistance. However in order to stabilize polycarbonates or provide or enhance certain characteristics which are not inherently present or only present to a slight extent in polycarbonates, additive addition is employed. Non limiting examples of such additives include thermal stabilizers such as phosphites, stabilizers against ultraviolet radiation effects such as the benzophenones or benzotriazoles, mold release additives, fillers such as fibers or mats preferably glass fibers, flame retardant materials such as halogen substituted organics and salts, particularly aryl sulfonate salts, and the like. One of the positive attributes an additive must have is compatibility with the resin particularly at the processing temperatures of the additive containing composition. Sometimes the processing temperature of the polymer containing composition is so high a particular additive therein is substantially volatilized, substantially degraded, or interacts with the polymer. Such degradation of the additive can also lead to degradation of the polymer itself. Whatever the mechanism of action, it has been found that certain additives which perform up to expectations in certain polymer systems do not perform well in other polymer systems.

One of the potential problems in processing aromatic polycarbonates has been caused by its high Tg. Although this is partially responsible for certain of its excellent properties, care must be taken to avoid thermal damage to the aromatic polycarbonate whereby its properties are lessened through thermal degradation of the polymer per se or additives which may be present. It is also possible to remove certain classes of potential additives as effective aromatic polycarbonate additives due to their lack of stability, volatility or in general their response to the thermal processing window.

Recently, a new copolyestercarbonate has been prepared. This new polymer described in U.S. Pat. No. 4,983,706 as well as U.S. Ser. Nos. 07/455,118, 07/476,068, both now abandoned, and U.S. Ser. No. 07/627,517 has aromatic polycarbonate like properties together with substantially increased flow at the same molecular weight as an ordinary aromatic polycarbonate. Moreover, it can be processed at a significantly reduced temperature than an aromatic polycarbonate having substantially the same properties because of a reduced Tg. This polymer system is a species of a broader class of polymer composition which have polycarbonate or polycarbonate like properties but which can be processed at significantly lower temperatures. These polycarbonate or polycarbonate like compositions can have admixed therein additives which previously could not be processed compatibly with the traditional aromatic polycarbonates such as bisphenol-A polycarbonate. Examples of such polycarbonate polymer systems having significantly reduced processing temperatures include but are not limited to the following: polycarbonates with plasticizers such as a phosphate, polycarbonates with long chain aliphatic carboxylic chain stoppers, polycarbonates with short chain aliphatic carbonates, oligomeric carbonates, polycarbonates with selected dihydric phenols such as those having a long chain aliphatic group on the gem carbon atom connecting the two phenols. Examples of blends of polycarbonates with other polymers wherein the blend has a significantly lower processing temperature than polycarbonate include admixing polycarbonate with polyesters, such as, polybutylene terephthalate and 1,4-cyclohexanedimethanol containing polyesters.

It has now been discovered that certain additives which were once considered borderline or ineffective with polycarbonate can now be successfully processed with such polycarbonate systems, particularly, an aromatic copolyestercarbonate having polycarbonate like properties described above. Although not to be constrained to this theory of mechanism, it is believed that the lower processing temperature of the new copolyestercarbonate maintains the integrity of the additive during processing. These new compositions are now available for applications which were not filled or inadequately filled by past aromatic polycarbonate compositions.

SUMMARY OF THE INVENTION

In accordance with the invention there is a composition which comprises a polymer composition having polycarbonate or polycarbonate like properties which processes at significantly lower temperature than aromatic polycarbonate in admixture with an additive which is incompatible with an aromatic polycarbonate at ordinary processing temperature. Preferred is a composition comprising a copolyestercarbonate having repeating units of the structure

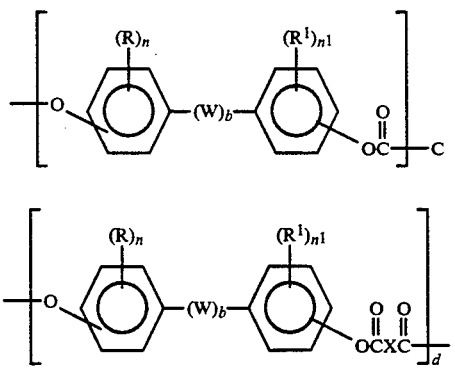

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
W is selected from divalent hydrocarbon radicals, —S—, —S—S—, —O—,

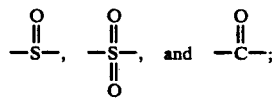

n and $n^1$ are independently selected from integers having a value of from 0 to 4 inclusive;
b is either zero or one;
X is an alkylene group of about 6 to 18 carbon atoms, inclusive;

d is from about 2 to 30 mole percent of the total units c+d; and effective amounts of a near infra red screening effective amount of a aminium or diimonium salt.

DETAILED DESCRIPTION OF THE INVENTION

Various examples of the polymeric systems which have significantly lowered processing temperatures compared to standard aromatic polycarbonate have been previously disclosed and discussed. With respect to the additives which can be now used compatibly with the reduced processing temperature materials, there are included such additive functions as certain ultraviolet screeners, anti-static agents and certain pigments and dyes. Of particular utility in the reduced processing temperature polymeric systems are the near infra red screening additives such as specific aminium and diimonium salts as well as infra red screening phthalocyanines. The particular polymeric system is the copolyestercarbonate disclosed in the aforementioned U.S. Pat. No. 4,983,706.

Dihydric phenols which are useful in preparing the preferred copolyestercarbonate of the invention may be represented by the general formula

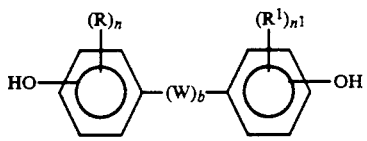

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, —S—, —S—S—, —O—,

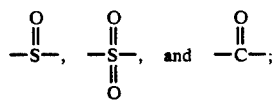

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors such as phosgene, diphenyl carbonate and the like. When using an interfacial process or a bischloroformate process it is also preferred to use a standard catalyst system well known in the synthesis of polycarbonates and copolyestercarbonates. A typical catalyst system is that of an amine system such as tertiaryamine, amidine or guanidine. Tertiary amines are generally employed in such reactions. Trialkylamines such as triethylamine are generally preferred.

The monomer which supplies the ester units in the copolyestercarbonate is an aliphatic alpha omega dicarboxylic acid or ester precursor from 8 to about 20 carbon atoms preferably 10 to 12 carbon atoms. The aliphatic system is normal, branched or cyclic. Examples of the system include azelaic acid, sebacic acid, dodecanedioic acid, C14, C18 and C20 diacids. The normal saturated aliphatic alpha omega dicarboxylic acids are preferred. Sebacic, and dodecanedioic acid are most preferred. Mixtures of the diacids can also be employed. It should be noted that although referred to as diacids, any ester precursor can be employed such as acid halides, preferably acid chloride, diaromatic ester of the diacid such as diphenyl, for example the diphenylester of sebacic acid. With reference to the carbon atom number earlier mentioned, this does not include any carbon atoms which may be included in the ester precursor portion, for example diphenyl The copolyestercarbonates of the invention can be prepared by the known methods, for example those appearing in Quinn U.S. Pat. No. 4,238,596 and Quinn and Markezich U.S. Pat. No. 4,238,597. Examples of such processes include the formation of acid halides prior to the reaction of the ester forming group with the dihydric phenol and then followed by phosgenation. Still further, the basic solution process of Goldberg in the U.S. Pat. No. 3,169,121 reference utilizing a pyridine solvent can also be employed while also using the dicarboxylic acid per se. A melt process utilizing the diesters of the alpha omega dicarboxylic acids can also be employed. An example of such a compound is the diphenylester of sebacic acid.

After substantial experimentation, it has been found that a preferred process for making the copolyestercarbonates of this invention exists. The process of Kochanowski, U.S. Pat. No. 4,286,083 (083) was initially utilized and then improved upon. It was found that lower diacids such as adipic acid were not incorporated into the polymer backbone to any great extent. Rather, one had to go up to higher carbon atom dicarboxylic acids before any significant incorporation of diacid into the backbone was observed We have found that the diacid is preferentially introduced as the preformed salt, preferably an alkali metal such as sodium into the interfacial reaction reactor The water phase is maintained at an alkaline pH preferably from about 8 to 9 for most of the phosgenation period and then raising the pH to a level of about 10 to 11 for the remainder of the phosgenation time period which is generally a minimum of 5%.

In order to control molecular weight, it is standard practice to utilize a chain stopping agent which is a monofunctional compound. This compound when reacting with the appropriate monomer provides a non-reactive end. Therefore the quantity of chain stopping compound controls the molecular weight of the polymer. Bulkier chain terminators than phenol should provide substantially better retention of physical properties such as impact. Examples of these bulkier substituents include paratertiarybutylphenol, isononyl phenol, isooctyl phenol, cumyl phenols such as meta and paracumyl phenol, preferably paracumyl phenol, as well as chromanyl compounds such as Chroman I.

The copolyestercarbonate of this invention with the standard endcapping reagent possesses a substantially lowered glass transition temperature, Tg, therefore providing processability at a lower temperature. Surprisingly accompanying this low temperature processability are substantially equivalent physical properties as a standard polycarbonate of the same intrinsic viscosity as the inventive composition and very high flow rates.

The aliphatic alpha omega dicarboxylic acid ester is present in the copolyestercarbonate in quantities from about 2 to 30 mole percent, based on the dihydric phenol. Generally with quantities below about 2 mole percent the Tg is insufficiently lowered and significantly altered flow rate is not observed. Above about 30 mole percent, the physical properties of the copolyestercarbonate are significantly hindered in comparison to the polycarbonate without the aliphatic ester linkages. Preferred mole percents of aliphatic alpha omega dicarboxylic acid ester are from about 5 to 25 and more preferably about 7 to 20 mole percent of the dihydric phenol.

The weight average molecular weight of the copolyestercarbonate can generally vary from about 10,000 to about 100,000 as measured by GPC, using a polystyrene standard corrected for polycarbonate. A preferred weight average molecular weight is from about 16,000 to about 40,000.

The copolyestercarbonate has the following structural units.

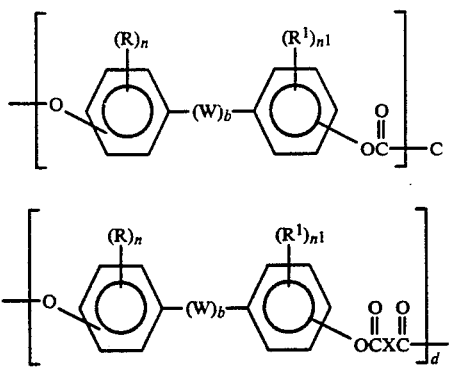

where R, $R^1$, n, $n^1$, W and b have been previously described and X is an alkylene grouping of about 6 to about 18 carbon atoms, inclusive. The d repeating unit is present in the copolyestercarbonate in from about 2 to 30 mole percent of the total of the repeating units c+d, X is preferably about 8 to 16 carbon atoms, inclusive. The alkylene system is preferably saturated and is normal, branched, cyclic or alkylene substituted cyclic. The mole percent of d is preferably about 5 to 25 and more preferably about 7 to 20 mole percent. For example, when 5 moles of bisphenol-A reacts completely with 4 moles of phosgene and 1 mole of dodecanedioic acid, the resulting copolyestercarbonate is said to have 20 mole percent ester content That is, the d unit is 20 mole percent of the c+d units.

The additive employed in the composition is an infra red screener which is generally employed for screening in the near IR region. These salts and other salts of the invention as well as their methods of preparation are disclosed in the following U.S. patents: U.S. Pat. Nos. 3,251,881; 3,341,464; 3,400,156; 3,575,871; and 3,715,386. All these patents are incorporated herein by reference. Representative examples of aminium and diimonium salts are the following:

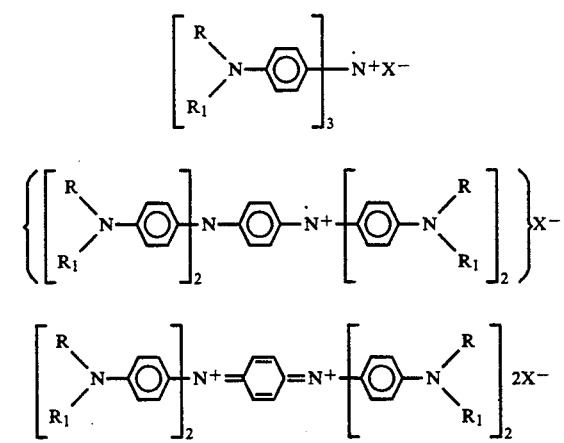

wherein R is hydrogen, allyl, benzyl, alkyl of one to twelve carbon atoms inclusive, cycloalkyl of five to seven carbon atoms, inclusive, $R_1$ is allyl, benzyl, alkyl of one to twelve carbon atoms, inclusive or cycloalkyl of five to seven carbon atoms, inclusive. X is an anion, generally obtained from a silver salt of a suitable acid.

Examples of alkyl groups include methyl, ethyl, propyl, butyl, hexyl, octyl, decyl; dodecyl and branched isomers thereof such as isopropyl, tertiary butyl; 2,3-dimethylbutyl; 1,1,3,3-tetramethylbutyl, isododecyl and the like. Preferred alkyl groups are from one to six carbon atoms, more preferably one to three carbon atoms.

Examples of the anions include the simple acid anions such as chloride, nitrate, sulfate, phosphate and more complex ones such as perchlorate, fluoborate, chloroacetate, trifluoroacetate, picrate, hexafluoroarsenate, hexafluoroantimonate, benenzenesulfonate, ethanesulfonate and the like. The preferred anions are those which are compatible with the copolyestercarbonate, for example those which are not very corrosive (not halogenic such as chloride) and those which are not very nucleophilic, that is make a strong base upon hydrolysis. Example of such anions are the hexafluoroantimate, arsenate and the like.

These nitrogen containing salts are all known in the art and prepared by methods disclosed in the prior U.S. patents incorporated by reference. They are known as near infra red screeners for a number of polymers. By near IR region is meant a range of from about 700 nanometers (nm) to about 5000 nm. Improved absorption is obtained in the region of longer wavelengths between about 1,000 and about 1,800 nm. Many of the compounds also have desirable absorption at shorter wavelengths in the near infrared region. These compounds also transmit a useful amount of visible light. While by the foregoing definition the near infrared region extends only down to about 700 nm, for purposes of this invention the region of particular interest extends from about 650 to about 1300 nm. In the following discussion this region will be designated as the (NIR).

In many circumstances it is desirable to filter out nonvisible radiations of the near-infrared region without materially diminishing transmission of visible radiations. There are many potential applications for materials that will transmit a major portion of the visible radiations but at the same time be at least semiopaque to heat-producing infrared radiation, particularly that in the above-noted (NIR). Among such possible applications may be mentioned sunglasses, welders' goggles and other eye protective filters, windows, television filters, projection lenses, military eyewear, laser protective eyewear, and the like. In many, if not most, of such uses the primary object is to protect the human eye from the adverse effects of radiation outside the visible region. However other utilities, for example, those which require the removal of certain bands of visible light are also important.

In use, the salts of the present invention may be incorporated in the polymeric system, particularly the copolyestercarbonate. Copolyestercarbonate containing the salts can be molded into formed articles. These compounds may be incorporated in transparent copolyestercarbonate sheets or films for windows, doors, sky-lights, etc. in buildings, green-houses, automobiles, aircraft, ships, etc. to screen out infrared radiation and minimize heat build-up in the interiors of such structures while still transmitting visible radiation. Specific applications are in sunglasses, welder's goggles or shields, astronaut's face-plates, face-plates in fire-fighters' reflective protective suits, military eyewear and lenses where transparency for vision coupled with protection of eyes from infrared radiation are desired. Also filtration of a specific wavelength light for the involved application can also be important. In such applications, these compounds may be dispersed in the copolyestercarbonate, preferably in a homogeneous manner but can be concentrated in a band near the surface wherein light is expected. For sunglasses, aircraft windows, and skylights, these compounds may be incorporated in the plastic of which such articles are made, either as a uniform dispersion throughout or as a barrier layer adjacent one surface thereof.

Although many of the salts used herein have good absorption in the UV range, it may be preferable to have a UV absorbing additive also present in the composition. The quantity of nitrogen salt of the invention that should be employed with the copolyestercarbonate is a near infra red screening effective amount. Based on the amount of copolyestercarbonate in admixture with the nitrogen salt, the salt can vary from about 0.01 to about a quantity wt. % of the copolyestercarbonate which allows at least about 10% of the visible light to be transmitted. A minimum of about 0.05 wt. % is preferable for those additives which do not remove a substantial portion of visible light. The nitrogen salt need not be present in an equal or near equal amount throughout the molded or extruded material but can be in a relatively dense band near the surface. When the nitrogen salt is present in a relatively dense band near the surface of the article, the weight percent can be reduced somewhat since it is not dispersed through the entire thickness of the article.

Useage of the copolyestercarbonate together with the nitrogen salt is advantageous. A wider and lower temperature processing window is obtained for the admixture with a concomitant retention of the nitrogen salt as nondegraded material within the admixture. Additionally higher molecular weight polymer can be used for compositions wherein higher mechanical properties are desired and near IR screening is still effective in such admixtures.

As seen in the examples below, the nitrogen salts of the invention are effective near IR screeners for the copolyestercarbonates of the invention. Substantially more nitrogen salt is left in the copolyestercarbonate composition than is present in the polycarbonate composition of similar molecular weight after processing such as extrusion and part molding. The molecular weight of the copolyestercarbonate composition remained essentially constant during processing while the polycarbonate molecular weight is substantially reduced. The impact strength of the copolyestercarbonate composition was higher than the polycarbonate composition of similar molecular weight prior to processing.

EXAMPLES

Example 1

Bisphenol-A polycarbonates of varying molecular weights were prepared by standard interfacial reaction. Bisphenol-A copolyestercarbonates having 9 mole percent normal dodecanedioate content and similar or the same molecular weights as the polycarbonate were prepared by methods in this specification. The weight average molecular weight of each polymer was measured by GPC. The melt flow of each polymer was measured by ASTM D 238. Below are the results. PC is bisphenol-A polycarbonate, PEC is copolyestercarbonate.

TABLE I

| Resin | MW | MF 300° C. |
|---|---|---|
| PC | 22,500 | 25 |
| PEC | 22,500 | 49 |
| PC | 24,000 | 15 |
| PEC | 24,000 | 29 |
| PC | 28,000 | 9 |
| PEC | 28,000 | 19 |
| PC | 31,500 | 5 |
| PEC | 31,500 | 11 |

These results show that over a wide variation of molecular weight, the PEC at a given molecular weight provides about twice the melt flow of a PC of the same molecular weight.

Example 2

To the resins prepared above in Example 1 was added 0.1 weight percent (based upon weight of PC or PEC) of a diimonium salt of the formula

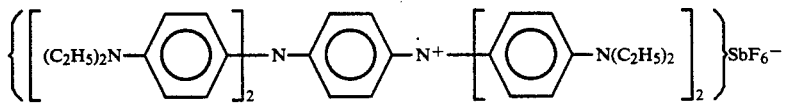

This salt was obtained by the procedure described in U.S. Pat. No. 3,575,871, previously incorporated by reference.

Also present in each of the compositions was 0.05 wt. % Irgafos 168, a phosphite.

The compositions were extruded at between 195° C. and 250° C., their optimum temperature, and injection molded into ⅛ inch Izod bar at the minimum melt temperature necessary to fill the part.

Each of the PEC compositions showed excellent near IR screening ability as measured by near infrared spectoscopy. The stability of the screening agent after extrusion and after molding was measured photometrically at about 1440 nm. Such absorbance is related to the presence of the screener in the composition. Each of the "% Salt lost" was measured from the original 0.1 wt. %.

TABLE II

| Resin | Mw | % Salt Lost after extrustion | after molding |
|---|---|---|---|
| PC | 22,500 | 7 | 9 |
| PEC | 22,500 | 5 | 9 |
| PC | 24,000 | 14 | 28 |
| PEC | 24,000 | 7 | 9 |
| PC | 28,000 | 25 | 49 |
| PEC | 28,000 | 6 | 10 |

The near IR screening effect of the salt is directly related to its presence in the composition. As can be seen by the above data the PEC composition of the invention contained far more of the screener salt after processing than the PC compositions. Therefore the screening effect of the salt was better and proportionality greater for PEC than PC.

Example 3

Similar compositions to Example 2 and containing the same salt at 0.1 wt. % and 0.05 wt. % Irgafos 168 were extruded into a pellet and molded into a ⅛ inch Izod bar. At each step, (powder, pellet and part) the weight average Mw was measured by GPC. Notched Izod according to ASTM D 256 was also measured on the Izod bar. Below are the results:

TABLE III

| Resin | Mw (Powder) | Mw (pellet) | Mw (part) | N. Izod ft/lb/in |
|---|---|---|---|---|
| PC | 22,400 | 21,700 | 21,900 | 11 |
| PEC | 22,500 | 22,600 | 22,400 | 13 |
| PC | 24,000 | 23,400 | 22,800 | 14 |
| PEC | 24,800 | 24,700 | 25,100 | 15 |
| PC | 27,700 | 25,700 | 24,200 | 15 |
| PEC | 27,800 | 27,400 | 27,600 | 16 |

The data demonstrate that the PEC compositions are far more stable as measured by Mw after a specific processing step than the corresponding PC composition. Degradation interaction has occurred to a greater extent in the PC compositions than the PEC compositions. The Notched Izod data show small but significant differences consistent with and confirming the observed decreases in Mw.

The experimental data of the Example demonstrate that salts normally used in other thermoplastics for their near IR screening effect were detrimental in traditional aromatic polycarbonates. However, these same salts are effective with very little if any detrimental effect on the copolyestercarbonate compositions of this invention.

Although this invention has been described in detail with a single polymeric system with significantly reduced processing temperature than the aromatic polycarbonate of like qualities, the inventive concept applies to the broadly described copolymeric systems. In the same manner, the detailed description has focused on one functional additive system, the near IR screener. However any additive system which is not sufficiently compatible with the thermal processing requirements of ordinary aromatic polycarbonate are within the generic concept of this invention.

Additionally other additives may be present in the composition, including for example the aforementioned ultraviolet screener, fillers such as glass, mold release agents and flame retardant agents.

What is claimed is:

1. A composition comprising an admixture of (a)

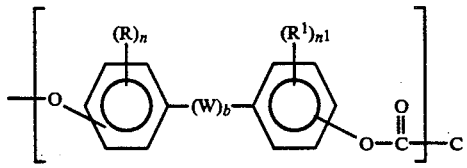

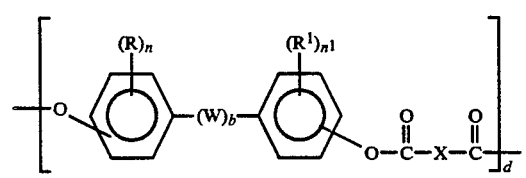

wherein:

R is independently selected from halogen, monovalent hydrocarbon, and monovalent hydrocarbonoxy radicals;

R¹ is independently selected from halogen, monovalent hydrocarbon, and monovalent hydrocarbonoxy radicals; the weight average molecular weight of (a) being from about 22,400 to 100,000;

W is selected from divalent hydrocarbon radicals, —S—, —S—S—, —O—, $$-\overset{O}{\underset{\|}{S}}-, \quad -\overset{O}{\underset{\underset{\|}{\overset{\|}{S}}}{S}}-, \quad \text{and} \quad -\overset{O}{\underset{\|}{C}}-;$$

n and n¹ are independently selected from integers having a value of from 0 to 4 inclusive;

b is either zero or one;

X is an aliphatic group of about 6 to 18 carbon atoms, inclusive;

d is from about 2 to 30 mole percent of the total units c+d; and (b) an effective amount of a near infra red stabilizing screener.

2. A composition comprising a copolyester carbonate as shown in "a" of claim 1 in admixture with an additive which is incompatible with an aromatic polycarbonate at standard processing temperature of the aromatic polycarbonate due to thermal reasons.

3. The composition in accordance with claim 1 wherein the screener is an aminium or a diimonium salt present in from at least about 0.01 wt. % of the copolyestercarbonate.

4. The composition in accordance with claim 3 wherein the salt is of the formula

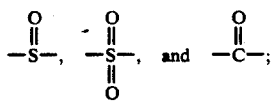

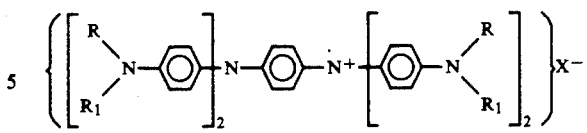

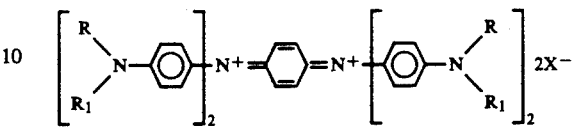

wherein R is hydrogen, allyl, benzyl, alkyl of one to twelve carbon atoms inclusive, cycloalkyl of five to seven carbon atoms, inclusive, R₁ is allyl, benzyl, alkyl of one to twelve carbon atoms, inclusive or cycloalkyl of five to seven carbon atoms, inclusive; and X is an anion.

5. An article molded from the composition of claim 1.

6. An article of claim 5 wherein (b) is located in a band near the surface of the molded article.

7. The composition in accordance with claim 3 wherein b is a salt of the formula

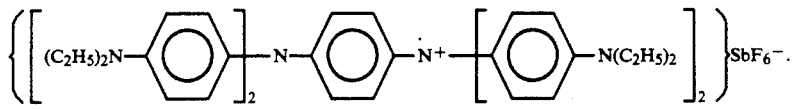

8. Goggles, sunglasses, and lenses in accordance with claim 5.

9. The composition in accordance with claim 3 wherein the copolyestercarbonate is bisphenol-A copolyestercarbonate.

10. The composition in accordance with claim 3 wherein X is a straight chain alkylene group of eight to ten carbon atoms.

11. The composition in accordance with claim 9 wherein X is a straight chain alkylene group of eight to ten carbon atoms.

12. The composition in accordance with claim 1 wherein an effective amount of an ultraviolet screener is also present.

13. The composition in accordance with claim 1 wherein a heat stabilizing agent is also present.

14. The composition in accordance with claim 1 wherein a mold release agent is also present.

15. The composition in accordance with claim 1 wherein a flame retardant agent is also present.

16. The composition in accordance with claim 1 wherein the screener is a phthalocyanine.

* * * * *